March 17, 1959
E. V. KNIGHT
2,877,858
VEHICLE OF THE FULL TRAILER TYPE
Filed March 5, 1957
3 Sheets-Sheet 1
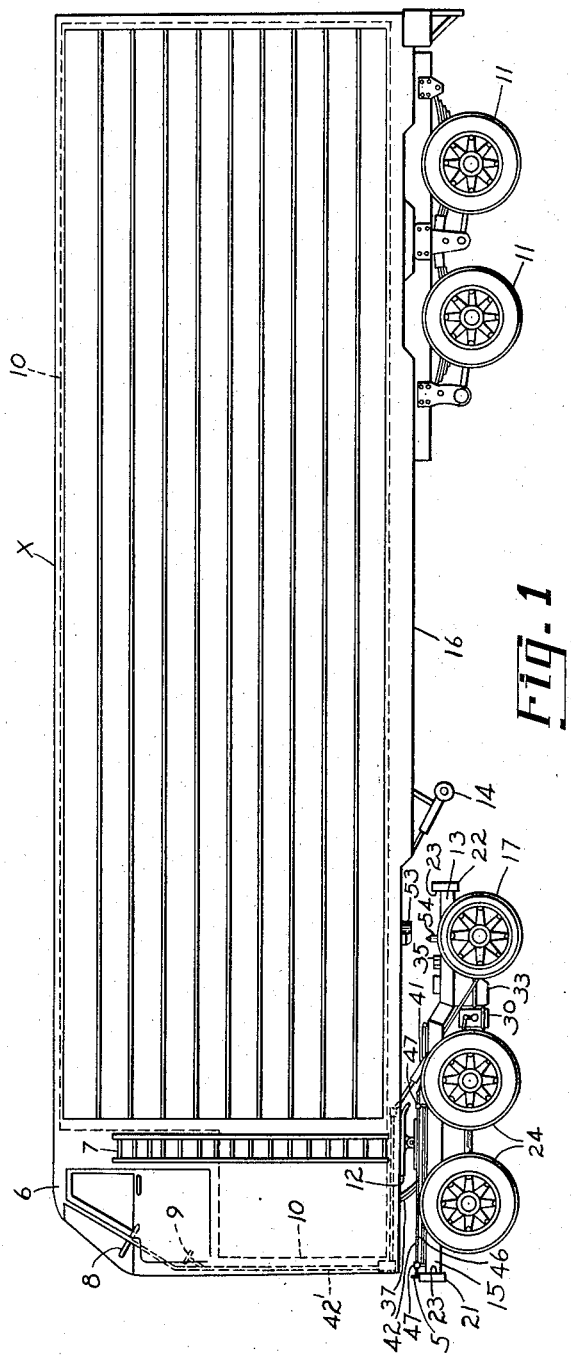
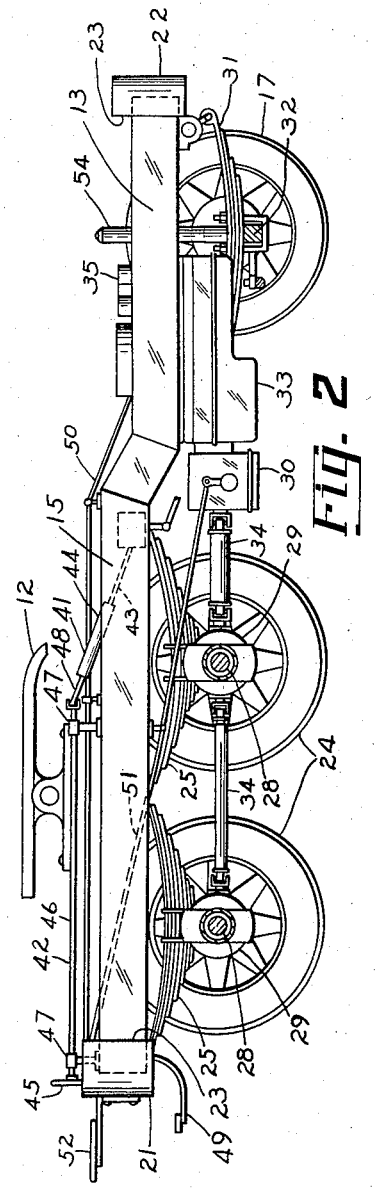
INVENTOR.
Earl V. Knight
BY
ATTORNEY March 17, 1959     E. V. KNIGHT     2,877,858
VEHICLE OF THE FULL TRAILER TYPE Filed March 5, 1957     3 Sheets-Sheet 2

INVENTOR.
Earl V. Knight
BY
ATTORNEY

March 17, 1959     E. V. KNIGHT     2,877,858
VEHICLE OF THE FULL TRAILER TYPE

Filed March 5, 1957     3 Sheets-Sheet 3

INVENTOR.
Earl V. Knight
BY
ATTORNEY

United States Patent Office
2,877,858
Patented Mar. 17, 1959

2,877,858

VEHICLE OF THE FULL TRAILER TYPE

Earl V. Knight, Minneapolis, Minn.

Application March 5, 1957, Serial No. 644,136

5 Claims. (Cl. 180—14)

My present invention relates broadly to motor driven wheeled vehicles, more specifically to a trailer type truck cargo transport or passenger bus, and particularly to a full trailer type vehicle of the class described having independent interchangeable tractive and steering units of novel design and arrangement.

The principal object of the invention is to provide a full trailer type vehicle of the type described embodying a novel tractive and steering unit that is entirely independent of the vehicle's trailer and control cab unit, said tractive and steering unit being interchangeably connected directly beneath the main body portion and control cab unit of a full trailer, thus increasing materially the cargo carrying space of the unit by eliminating the lost space common to semi-trailer type vehicles wherein the tractor and control cab are independent of the cargo carrying body of the trailer.

Another object of this invention is to provide a full trailer type vehicle wherein that portion of the length of the combined tractor and semi-trailer units heretofore chargeable against the allowable length limits of the combined units, affords space for additional pay loads instead of the lost space between the interconnected tractor and semi-trailer units.

Another object of this invention is to provide a full trailer type vehicle wherein the traction unit is provided with a full set of controls, i. e. brakes, steering, engine controls and operator's auxiliary seat, thus making it possible to drive the traction and steering unit out of engagement with the full trailer type body that may be left fully supported by conventional means.

Another object of this invention is to provide a full trailer body that is detachably connected to the traction and steering unit and in which a minimum of separable control connections between the control cab and the traction and steering unit must be released to completely detach the one unit from the other.

Another object of this invention is to provide a full trailer type vehicle embodying two pairs of driven forwardly mounted traction ground wheels and a pair of steering wheels mounted rearwardly of the traction wheels, which, by virtue of said steering wheel mounting, a very sharp turning radius is provided.

Another object of this invention is to provide a full trailer type vehicle which, by virtue of its novel steering arrangement, is virtually impossible to "jack-knife," a dangerous fault common to semi type trailers under certain road conditions.

Another object of this invention is to provide a full trailer type vehicle having an independent braking system intergral with the body and control cab portion thereof, whereby braking effort may be applied to the rear wheels thereof from the control cab independently of the main braking system of the combined traction and body units, thus affording braking means when the units are parked together or separated the one from the other.

Another object of this invention is to provide a vehicle having a full trailer type body wherein the control cab and cargo space are integral, thus making it unnecessary to replace the cab portion each time the traction unit is replaced as in the case of the semi type trailer.

These and other objects will become apparent from the following specification and claims when taken in conjunction with the appended drawings, which form a part of this application, and in which like characters indicate like parts throughout the several views.

Referring to the drawings:

Fig. 1 is a side elevational view of the full trailer type vehicle with its body and traction units connected for use;

Fig. 2 is a side elevational view of the traction unit alone;

Figure 3:
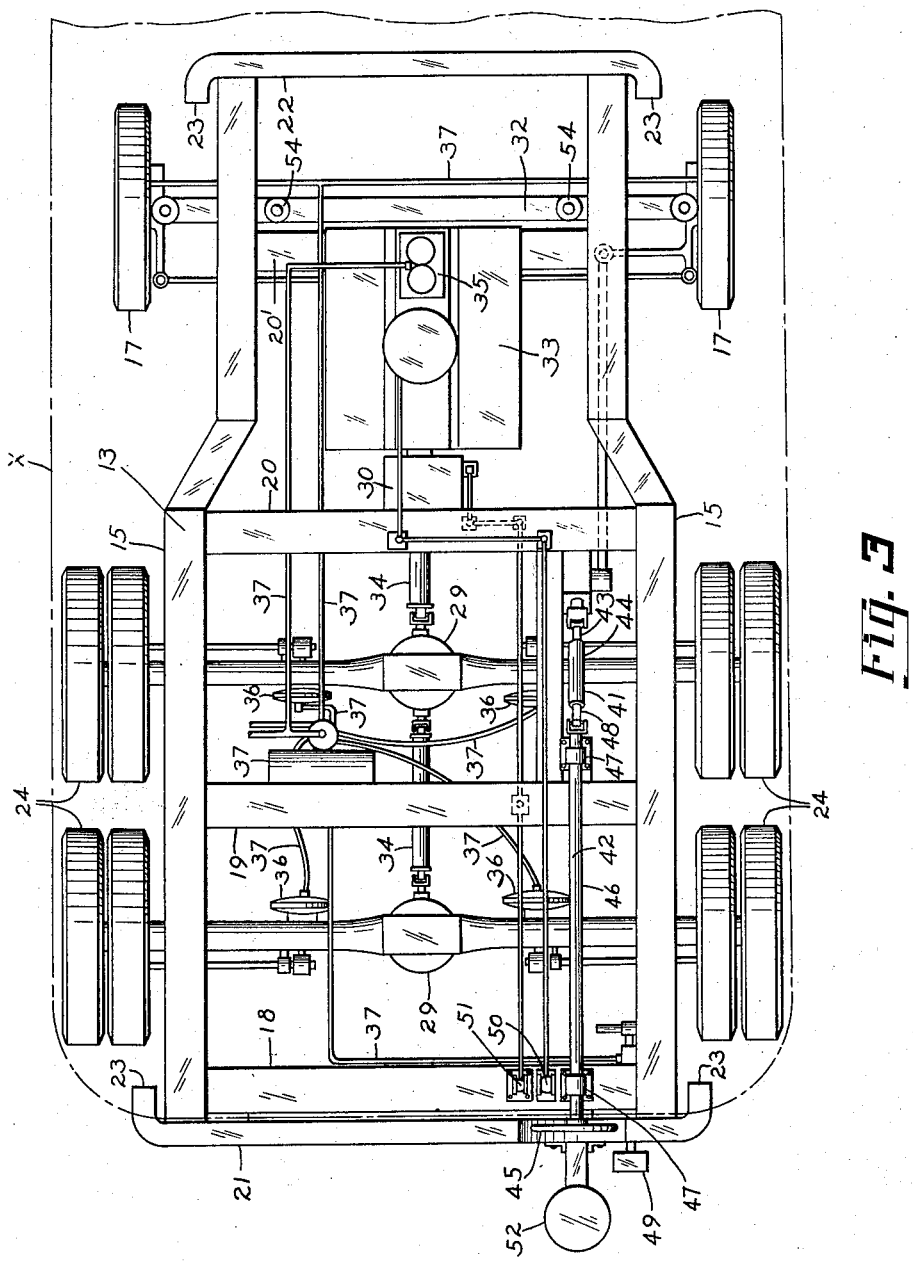
Fig. 3 is a top plan view of the same.

The reference character X is applied to the main body portion of the full trailer and the numeral 6 indicates the control cab portion thereof. The numeral 7 is directed to an access ladder leading to the control cab in which is located all operational controls for the assembled units; to wit: a conventional steering wheel 8, and power brake pedal 9. The parts named thus far, of course, are conventional except as they may be varied to meet manufacturing specifications. The broken line 10 indicates substantially the tremendously increased cargo carrying space of the full trailer embodying my novel design.

It is important to note, however, that the control cab 6, being located as it is, high and integral with the full trailer body, not only affords better vision for the operator, but makes possible the use of the space beneath the cab 6 as cargo pay load made possible by the novel separable arrangement of the traction unit wherein the space beneath the cab on a standard full truck is used to house the engine. Obviously, my arrangement as described herein provides a unit having the advantage of the full truck and the semi-trailer and none of the disadvantages of either that have heretofore presented problems to operators. Relative to the control cab 6 further reference is made to the fact that my invention provides for a control cab section formed integral with the body portion X of the full trailer and thus remain a part of the same throughout the useful life of the trailer which, generally speaking, will outlast several tractors, reference being had to the semi-trailer arrangement wherein the control cab is formed integral with the tractor. Obviously, under the semi-trailer arrangement, when a new tractor is necessary, the cost of the same must obviously also include the cost of the cab body and the many components that are located therein for control purposes or which combine to form the same, i. e. body, doors, glass, steering and braking controls, starting controls, and instrument panels, seats, and all other functional operational components placed therein at the disposal of the operator. In my present arrangement, this equipment is all an integral part of the full trailer body and serves its capacities throughout the life of the full trailer without regard for the number of traction units that may be used with said trailer X.

Inasmuch as the novelty in this application resides in improvements and novel arrangements of parts and combination of an old machine, it is thought to be unnecessary, in the interest of brevity and clarity, to illustrate and refer in detail to old combinations which form a part of this invention and, therefore, such reference will be made to them only as required to define the relationship of said parts to the invention as workable entirety.

Thus, in addition to the conventional parts heretofore named and identified, the full trailer body will be understood to be provided with a full set of controls, in the interior of the control cab, not shown. A pair of conventional spring mounted wheels 11 are mounted in tandem arrangement to support the rear end of the full trailer and a conventional horizontally disposed fifth wheel 12 supports the front end portion of the full trailer. The fifth wheel 12 is rigidly attached to the frame structure of the traction unit that will be identified hereafter as an entirety by the numeral 13.

A conventional pair of extensible wheel mounted dolly wheels 14 are pivotally attached to the forward end portion of bed frame of the full trailer body X to support the front end portion of the same when the same is not normally suported by the traction unit 13. These dolly wheels 14 provide vertical adjustment for the front end portion of the full trailer X, said movement being imparted by a crank-actuated jack-screw or provided in the form of a hydraulic ram to support the full trailer when free of the traction unit and/or to facilitate the engagement or disengagement of these trailer units, the one from the other as may be desired. By pivotally mounting the dolly wheels 14 to the bed frame of the trailer X, said members may be swung rearwardly on their pivot point and locked or fixed in that position to afford ample ground clearance.

It will, of course, be understood that air and hydraulic lines will be separably connected between the control cab 6 and the traction unit 13 and that electrical circuits from said cab to the said traction unit will also be separably connected between said units, said controls and cooperating indicating instruments and switches for electrical circuits being provided in dual arrangement in the control cab and on the traction unit, as will be presently described.

It is desired and important at this point to make further note that while the result achieved by my novel rearrangement of conventional parts provides a vehicle that is radically different from existing vehicles such as cargo carriers and buses as said arrangement makes possible the utilization of allowed length for increased pay loads. It will thus be understood that many conventional components are combined to achieve this desired result and for that reason those parts that are lacking in inventive concept will be named and identified hereafter in the interest of brevity and clarity.

The numeral 13 is directed to the traction unit as an entirety, which unit may be interchangeably connected by a fifth wheel arrangement 12 to connecting elements, not shown, which are rigidly attached to the forward end of the bed frame of the full trailer unit X. A complete set of dual controls, not shown, i. e. brake, steering and electrical, make it possible for a single operator to easily disconnect the units 13 and X, the one from the other or vice versa, under power of the said traction unit.

Figure 4:
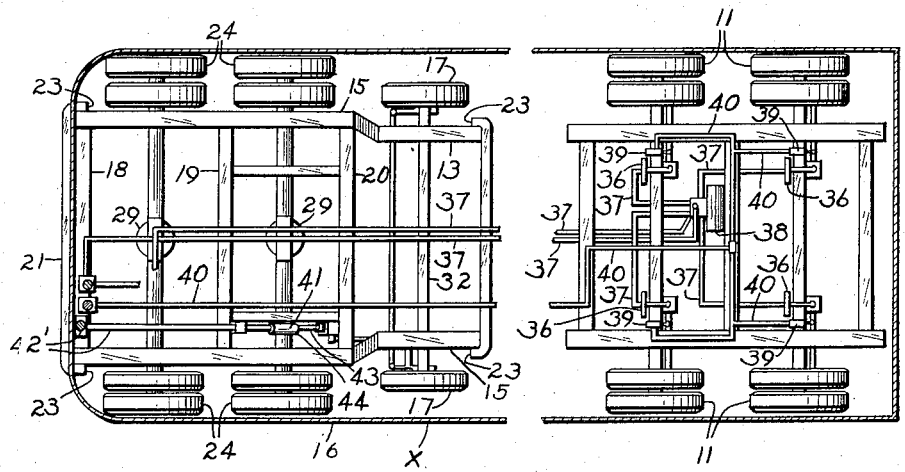
Fig. 4 is a top plan view diagrammatically showing the traction unit and full trailer chassis on a reduced scale with portions of the full trailer body being broken away and with the fluid lines for the braking and steering system shown by means of heavy lines.
Figure 5:
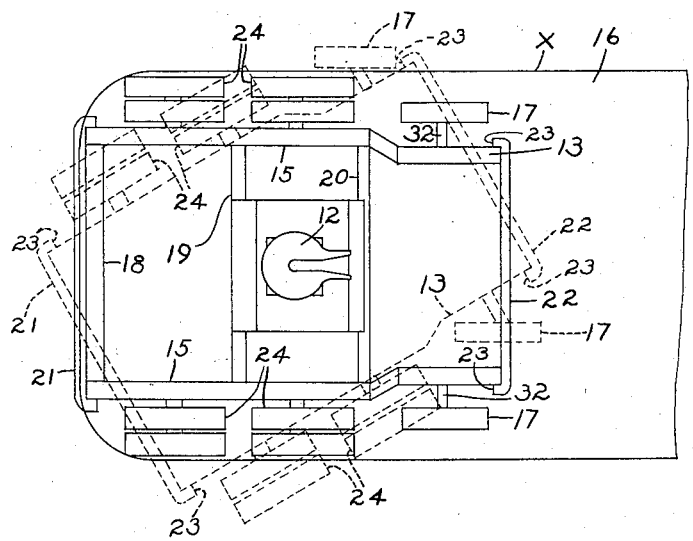
Fig. 5 is a fragmentary top plan view of the traction unit showing the same in a turning position by means of broken lines.

The numeral 15 indicates a pair of heavy longitudinally extended side members that form a part of a base frame having two different elevations, see Figs. 1 and 2, the rear end portion of which being dropped to afford clearance for the turnable traction unit with respect to the overlying bed frame of the full trailer body X. The said rear end portion of the frame member 15 also is narrowed substantially in a lateral plane to afford clearance for a pair of steering ground wheels 17, see Figs. 2, 3, 4 and 5.

A transverse front cross-tie member 18 and a plurality of intermediately longitudinally spaced transverse cross-tie members 19, 20 and 20', respectively, comprise the base frame structure. Said base frame further includes front and rear bumper members 21 and 22, respectively, which are rigidly attached to the end portion of the frame members 15 and are provided with rounded inturned end portions 23 that are extended rearwardly and forwardly, respectively, depending upon its mounted position. The traction unit employs the principle of front wheel drive and driven ground wheels. Traction wheels 24 are conventionally mounted in dual arrangement on leaf type springs 25, said springs being attached to hangers on the inside of the frame members 15 by conventional links. The dual traction wheels are mounted for front wheel drive through conventional axle differential and transmission gearing, said elements being identified herein by the numberals 28, 29 and 30, respectively. It will be understood that the use of either automatic or manual transmission is optional at the discretion of the manufacturer and, as before stated, these elements being of conventional design, their showing on the drawing is diagrammatical.

A pair of steering ground wheels 17 are mounted on the rear end portion of the traction unit 13 on a leaf spring 31 and axle assembly 32 in combination with conventional steering mechanism modified only as to the arrangement of its component parts. An engine 33 is mounted in the rear end portion of the unit 13 between the frame side members 15 and its power transmission to the dual drive wheels 24 is accomplished through an automatic transmission 30, as shown, and dual drive shafts 34 cooperating with dual differentials 29. A compressor 35 is diagrammatically shown, and is mounted adjacent the engine and supplies the air for the main braking assembly also diagrammatically shown with reference to its individual wheel cylinders 36 and air lines 37. The said air lines 37 are provided with separable means adjacent a reserve air tank and valve 38, whereby the said lines 37 to the controls in the cab 6 may be disconnected when the traction unit 13 is disengaged from the trailer unit X.

In addition to the main air brake system, there is provided an emergency hydraulic system, the same being integral with the trailer body and being entirely of standard conventional design. This hydraulic system is controlled by a pedal or lever in the control cab 6 and a master cylinder and wheel cylinders cooperate with the manual control to impart braking means to the four trailer wheels in the event of failure of the primary air brake system and also to afford braking means when the trailer is not attached to the traction unit 13. This secondary independent braking system is highly important for the reason that in the event of the failure of the air system, the operator can exert powerful braking effort on the trailer wheels, which permits the entire assembly to be brought under control independent of the air system. This control is not possible with the semi-trailer braking system for the reason that if a hydraulic secondary system were installed, it would impose problems in connecting and disconnecting the hydraulic lines each time the tractor was disconnected from the trailer unit. In the system disclosed herein, with the entire hydraulic system and its controls integral with the full trailer body, it is not necessary to disconnect any of the components that comprise the secondary braking system at any time. This secondary braking system is entirely conventional and hence it has not been thought necessary to show the same except as diagrammatically shown as wheel cylinders 39 and hydraulic lines 40 in Fig. 4, in combination with the primary air brake components also shown thereon.

Steering of the assembled traction unit and full trailer is accomplished through conventional controls and linkage with the exception that a separable coupling 41 is interposed in the steering column 42 which, for the purpose of this application, is shown as a splined or keyed shaft 43 having an endwise adjustable hub or sleeve 44 that is suitably locked when in operating position. The purpose of this separable coupling is to afford means whereby the control column 42' from the cab 6 may be disconnected from the traction unit 13. To accomplish this, the locking means on the hub (not shown) is released and the hub or sleeve 44 is moved longitudinally on the shaft until it clears the end of the splined shaft 48, thus permitting the traction unit to be driven away from the trailer unit. An auxiliary steering wheel 45 is mounted on the outer end of a long horizontally disposed shaft 46 that is journaled in brackets 47 mounted on the cross-tie members 18—19, respectively. The inner end of the shaft 46 is provided with a simple universal joint having a splined stub shaft 48 which has cooperating engagement with the hub 44. It will thus be seen that upon releasing the main steering control column 42', the stub shaft 48 may be moved into engagement with the hub 44 and thus afford steering control of the traction unit 13 by the auxiliary steering unit. Auxiliary braking controls in the form of a foot pedal 49 actuating the main braking system and auxiliary engine and transmission controls 50 and 51, respectively, are provided by which the independent movement of the traction unit may be facilitated when connecting the same or disconnecting it from the trailer unit. A jump seat 52 is removably secured to the front bumper member 21 adjacent the auxiliary controls to further facilitate the maneuvering of the traction unit into and out of engagement with the trailer.

Rigidly attached to the under side of the trailer bed frame is a radially disposed striker plate 53 that is in alignment with a pair of spring loaded ball and socket bumpers 54 that are rigidly attached to the rear axle 32 and which extend upwardly in a vertical plane to a point above the pivotally mounted ground steering wheels 17. These bumper members 54 are provided to limit the upward tilting movement of the traction unit 13 on rare occasions when ground or driveway conditions impose considerable tilting movement. Under such conditions, the spring loaded ball in the bumpers 54 will engage the striker plate 53 and thus prevent the steering wheels 17 from coming into engagement with the bed of the trailer to damage the same and restrict turning movement of the said steering wheels.

Throughout this specification, reference has often been made to conventional components, the use of which, modified to meet the demands and dimensional requirements of the novel structure described herein, is obviously the only practical means by which a full trailer type vehicle could be constructed. As has been stated fully in the objects of this invention, the prime purpose in developing a vehicle of this type for use as a cargo transport or passenger-carrying bus has been to produce more pay load space within statutory length limits. In developing the vehicle to the above end, other factors pertaining to the operation of such vehicles especially their efficiency, safety, maintenance and cost, became evident and the invention is, therefore, directed particularly to the improvement of these factors.

It has not been my intention to endeavor to eliminate or improve upon already existing satisfactory components such as air and hydraulic braking systems, electrical systems, transmissions, power transmissions, differential drives and steering systems. Rather it has been the intention to make use of these existing components to better advantage and thus produce a vehicle having greater pay load possibility and greater safety factors. In both of the above factors, the semi-trailer leaves much to be desired especially from the standpoint of safety, a problem that has been well met by my novel design and arrangement of parts.

It is well known that there are many details that cannot be met in this patent specification, for the reason that they are manufacturing details that will vary depending upon the type of vehicle which will embody this design; for example, the controls between the driver's cab and the respective components, i. e. engine, transmission, electrical system. Existing equipment can be employed and only the question of separable connections must be determined and those problems dictated by the manufacturing process. Obviously, a vehicle embodying a multiple speed automatic transmission would employ vastly different but even more easily met separable control problems than would a vehicle having manual controls. A passenger bus would present manufacturing problems not necessarily found in a cargo carrier. It is, therefore, hoped that the inventive concept set forth herein will be considered from the standpoint of a new and novel rearrangement of conventional components that combine to produce a vehicle that is novel, highly efficient in meeting highway and traffic problems encountered today and particularly possessed of a safety factor heretofore not achieved in any vehicle of the type described and claimed herein.

It would appear to be entirely superfluous to describe in detail and claim conventional components and it has, therefore, been the intent of the applicant to describe such components only to the extent as was deemed necessary to describe a workable operable device.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A vehicle of the class described comprising in combination, a traction unit and a full trailer unit, pivotal means detachably connecting the said traction unit and full trailer unit and supporting the front end portion of the said trailer unit on the said traction unit, at least one pair of ground wheels supporting the rear end portion of the trailer unit, an engine and at least one pair of driven ground traction wheels on the said traction unit, driving connections between the engine and said ground traction wheels, a pair of pivotally mounted ground steering wheels on said traction unit, primary braking means on the traction unit and the trailer unit operating in conjunction with said ground wheels, a control cab integral with said trailer unit and primary braking, steering and engine controls in said control cab, separable connections between the control cab and the traction unit for the said primary steering, braking and engine controls, secondary steering, braking and engine controls integral with said traction unit and independent of said primary controls, and secondary braking means and controls integral with said trailer unit for braking control, of the ground wheels of said trailer unit, said secondary trailer mounted braking system being independent of the primary braking system.

2. A vehicle of the class described comprising in combination, a traction unit and a full trailer unit, a horizontally disposed fifth wheel pivotally and detachably connecting the traction unit and the trailer unit, at least one pair of parallel ground wheels supporting the rear end portion of the trailer unit and secondary means in the form of a pair of vertically adjustable dolly wheels supporting the front end portion thereof when said trailer unit is detached from the supporting fifth wheel mounted on the traction unit, a control cab formed high in the front end portion of the traction unit, integral therewith and equipped with a full complement of steering, braking and engine controls, and indicating instruments therefor, an independent braking system integral with the trailer unit, said braking system having operating means in said control cab co-acting with braking means on each ground wheel of said trailer unit, said traction unit comprising a frame having front and rear integral bumper members, a pair of side members and at least one cross-tie member, at least one pair of parallel spring mounted driven ground traction wheels, and a pair of parallel spring-mounted pivotal ground-engaging steering wheels, an engine mounted on the frame of said traction unit and driving connections between the engine and the ground traction wheels, a primary braking system comprised of conventional components integral with said traction unit, and separable controls for the engine, braking and steering systems between the control cab, and a traction unit and secondary, independent engine, braking and steering controls mounted integral on said traction unit, whereby said separable primary controls between the control cab on the trailer, and a traction unit may be disconnected and the traction unit driven from engagement with the trailer unit under its own power and control.

3. The structure defined in claim 2, further including automatic power transmission means between the engine and the traction ground wheels, primary transmission controls in the control cab of the trailer unit, separable means for the control system of said power transmission means between the trailer unit and the traction unit and secondary independent power transmission controls mounted on the traction unit whereby the said traction unit may be driven from engagement with the trailer unit under its own power.

4. The structure defined in claim 2 wherein the driven ground traction wheels of the traction unit are mounted forwardly of the ground steering wheels, thus affording a front wheel drive traction having an extremely sharp turning radius.

5. The structure defined in claim 2, further including a radially disposed striker plate rigidly attached to the under surface of the trailer body, and vertically disposed bumper members mounted on the traction unit in alignment with said striker plate to limit the vertical movement of the rear end portion of the traction unit.

References Cited in the file of this patent

UNITED STATES PATENTS 2,291,626    Huber _____ Aug. 4, 1942